(12) United States Patent
Wang et al.

(10) Patent No.: US 11,708,744 B2
(45) Date of Patent: Jul. 25, 2023

(54) PROCESS TO PRODUCE HYDROGEN FROM UNDERGROUND GEOTHERMAL RESERVOIRS

(71) Applicant: REVENTECH INC., Road Town Tortola (VG)

(72) Inventors: Jingyi Wang, SW Calgary (CA); Grant D. Strem, NW Calgary (CA); Ian D. Gates, NW Calgary (CA)

(73) Assignee: REVENTECH INC.

( * ) Notice: Subject to any disclaimer, the term of this patent is extended or adjusted under 35 U.S.C. 154(b) by 503 days.

(21) Appl. No.: 16/623,073

(22) PCT Filed: Jun. 14, 2018

(86) PCT No.: PCT/CA2018/050724
§ 371 (c)(1),
(2) Date: Dec. 16, 2019

(87) PCT Pub. No.: WO2018/227303
PCT Pub. Date: Dec. 20, 2018

(65) Prior Publication Data
US 2020/0182019 A1     Jun. 11, 2020

Related U.S. Application Data

(60) Provisional application No. 62/520,047, filed on Jun. 15, 2017.

(51) Int. Cl.
| | | |
|---|---|---|
| *E21B 36/00* | (2006.01) | |
| *E21B 43/08* | (2006.01) | |
| *E21B 43/38* | (2006.01) | |
| *C01B 3/02* | (2006.01) | |
| *F24T 10/20* | (2018.01) | |
| E21B 43/295 | (2006.01) | |
| *E21B 43/243* | (2006.01) | |

(52) U.S. Cl.
CPC ................ *E21B 36/00* (2013.01); *C01B 3/02* (2013.01); *E21B 43/08* (2013.01); *E21B 43/295* (2013.01); *E21B 43/38* (2013.01); *F24T 10/20* (2018.05); *Y02E 10/10* (2013.01); *Y02E 60/00* (2013.01); *Y02E 60/36* (2013.01)

(58) Field of Classification Search
CPC .... E21B 43/243; E21B 43/24; E21B 43/2401; E21B 43/247; E21B 43/30; E21B 43/168; E21B 36/00; E21B 43/166
See application file for complete search history.

(56) References Cited

U.S. PATENT DOCUMENTS

| | | |
|---|---|---|
| 6,755,251 B2 | 6/2004 | Thomas et al. |
| 7,431,084 B1 | 10/2008 | Upadhye |

FOREIGN PATENT DOCUMENTS

| | | |
|---|---|---|
| CA | 2545997 | 11/2006 |
| CA | 2920460 A1 | 2/2016 |
| WO | 2017136924 A1 | 8/2017 |

OTHER PUBLICATIONS

International Search Report for PCT/CA2018/050724, Prepared by the CA Intellectual Property Office, dated Aug. 23, 2018, 4 pages.

*Primary Examiner* — Zakiya W Bates
(74) *Attorney, Agent, or Firm* — Brooks Kushman PC; John E. Nemazi

(57) ABSTRACT

A geothermal reservoir induces gasification and water gas shift reactions to generate hydrogen. The hydrogen or protons are produced to surface by using hydrogen-only or proton-only membranes in production wells. Energy from the reservoir is produced to surface as protons or hydrogen.

15 Claims, 5 Drawing Sheets

PROCESS TO PRODUCE HYDROGEN FROM UNDERGROUND GEOTHERMAL RESERVOIRS

CROSS-REFERENCE TO RELATED APPLICATION

This application is the U.S. national phase of PCT Application No. PCT/CA2018/050724 filed on Jun. 14, 2018, which claims the benefit of U.S. Provisional Patent Application No. 62/520,047 filed on Jun. 15, 2017, the disclosures of which are incorporated in their entirety by reference herein.

TECHNICAL FIELD

The technical field relates to production of hydrogen from underground geothermal systems.

BACKGROUND OF THE INVENTION

Geothermal Energy is ubiquitous within planets like Earth and many technologies are in use which harvest thermal energy by producing hot water or hot gas or both and byproducts to surface.

In some areas hydrogen and carbon oxides are produced in amounts that could be potentially commercial as a byproduct of geothermal production. These gases are constituents of volcanic gas. The mixture of hydrogen and carbon oxides with steam can be considered a natural synthesis gas that can be used as a fuel or as a feedstock for chemical manufacturing.

The water-gas shift reaction occurs at temperatures and pressures in many underground geothermal systems which are accessible by existing drilling and well completion technology.

The water-gas shift reaction can occur at lower temperatures in the presence of carbon oxides, steam, copper, nickle, iron, or other catalytic materials. The hydrogen produced from these systems can be from deep rock sources such as natural hydrides but also from water through the water-gas shift reaction. Production of hydrogen from underground geothermal systems will tend to push the water-gas shift reaction such that more hydrogen is produced from the system.

Molten salt gasification can take place at temperatures and pressures in many underground geothermal systems which are accessible by existing drilling and well completion technology.

The water-gas shift reaction, molten salt gasification, and other water-splitting processes within a closed system create increased hydrogen concentrations and potentially other components e.g. carbon oxides and oxygen, within the fluids contained in the geothermal system.

Free oxygen can become bound through chemical oxidation reactions within the reservoir and sequestered or produced as oxides.

Surface processes such as steam-methane reforming have used hydrogen selective membranes such as palladium alloys or polymer membranes to separate very pure streams of hydrogen from a mixture of hot fluids.

Graphane, platinum, and sulfonated tetrafluoroethylene based fluoropolymer-copolymers (e.g. nafion) are examples of known hydrogen fuel cell proton carriers, otherwise known as proton selective membranes.

SUMMARY

Hydrogen is often found in deep underground geothermal systems. Hydrogen existing in geothermal reservoirs, or liberated from water within geothermal reservoirs by water gas shift, molten salt gasification, or other processes, can be selectively captured and produced to surface using hydrogen filters such as palladium alloy membranes.

There is a large and growing worldwide demand for hydrogen, which can be used as a chemical feedstock, or combusted at surface to produce power or heat or water, or consumed in fuel cell devices for production of power.

Hydrogen can be a substitute for oil and gas in most energy applications, with pure water as the byproduct of hydrogen combustion. Thus, the use of hydrogen is completely carbon and carbon dioxide free and can be considered as a totally clean fuel.

In broad aspects, methods and systems described herein view sufficiently hot underground layers within planets, where water pre-exists or can be introduced, as significant hydrogen sources.

Oxygen liberated within the reservoir can be produced separately for use at surface, or used to create oxides from naturally existing or injected hydrides for creation of energy and/or oxide products, which may be sequestered or produced. Via the water-gas shift reaction, the oxygen is often bound with carbon in the form of carbon oxides. In underground geothermal systems, the oxygen can also be bound in the form of silicon or iron oxides.

If the membrane chosen is proton selective instead of hydrogen selective, then the entire system can be considered a large natural fuel cell which can be used to produce electricity (power) and water at surface. The excess negative charge created within the Earth can be harvested for additional power through insulated wires, or dispersed by naturally occurring electrically conductive fluids and/or supercritical fluids.

Injection and production wells can take any possible configuration, including but not limited to horizontal, vertical, deviated, multi-lateral, J-shaped, corkscrew, or vermicular configurations. One well can be used for all functions, or one or more wells in a reservoir can be used for specialized functionalities. For example, one well can be used as an injector whereas another can be used as a hydrogen or power producer.

Carbon, carbon oxides, carbon hydrides, copper, or other catalysts can be naturally present or injected into the reservoir. Carbon oxide sequestration can occur in these reservoirs. Hydrides and other chemicals can be cracked and/or hydrogenated within these geothermal systems using hydrogen derived from this process. Oxygen scavenging chemicals may be injected and resultant oxides may either be produced to surface or left sequestered in the reservoir.

BRIEF DESCRIPTION OF THE DRAWINGS

Features and advantages of embodiments of the present application will become apparent from the following detailed description and the appended drawing in which.

DETAILED DESCRIPTION

Throughout the following description, specific details are set forth in order to provide a more thorough understanding to persons skilled in the art. However, well-known elements may not have been shown or described in detail to avoid unnecessarily obscuring the disclosure. The following description of examples of the technology is not intended to be exhaustive or to limit the invention to the precise form of any exemplary embodiment. Accordingly, the description and drawings are to be regarded in an illustrative, rather than a restrictive, sense.

Existing geothermal energy processes produce naturally existing volcanic gases and fluids and solids to surface, and also a portion of injected substances such as water. The Earth warms these fluids in the ground through heat transfer from Earth's interior or volcanic heat or exothermic chemical reactions or thermogenic radioactive decay.

Throughout this specification, numerous terms and expressions are used in accordance with their ordinary meanings. Provided below are definitions of some additional terms and expressions that are used in the description that follows.

As used herein, "reservoir" refers to a subsurface formation that includes a porous matrix which contains fluids. The fluids can consists of water, steam (water vapour), gases (e.g. oxygen, hydrogen, carbon oxides, methane, nitrogen, etc).

The term "in situ" refers to the environment of a subsurface reservoir.

Details are provided for the purpose of illustration, and the methods can be practiced without some or all of the features discussed herein. For clarity, technical materials that are known in the fields relevant to the present methods are not discussed in detail.

Figure 1A:
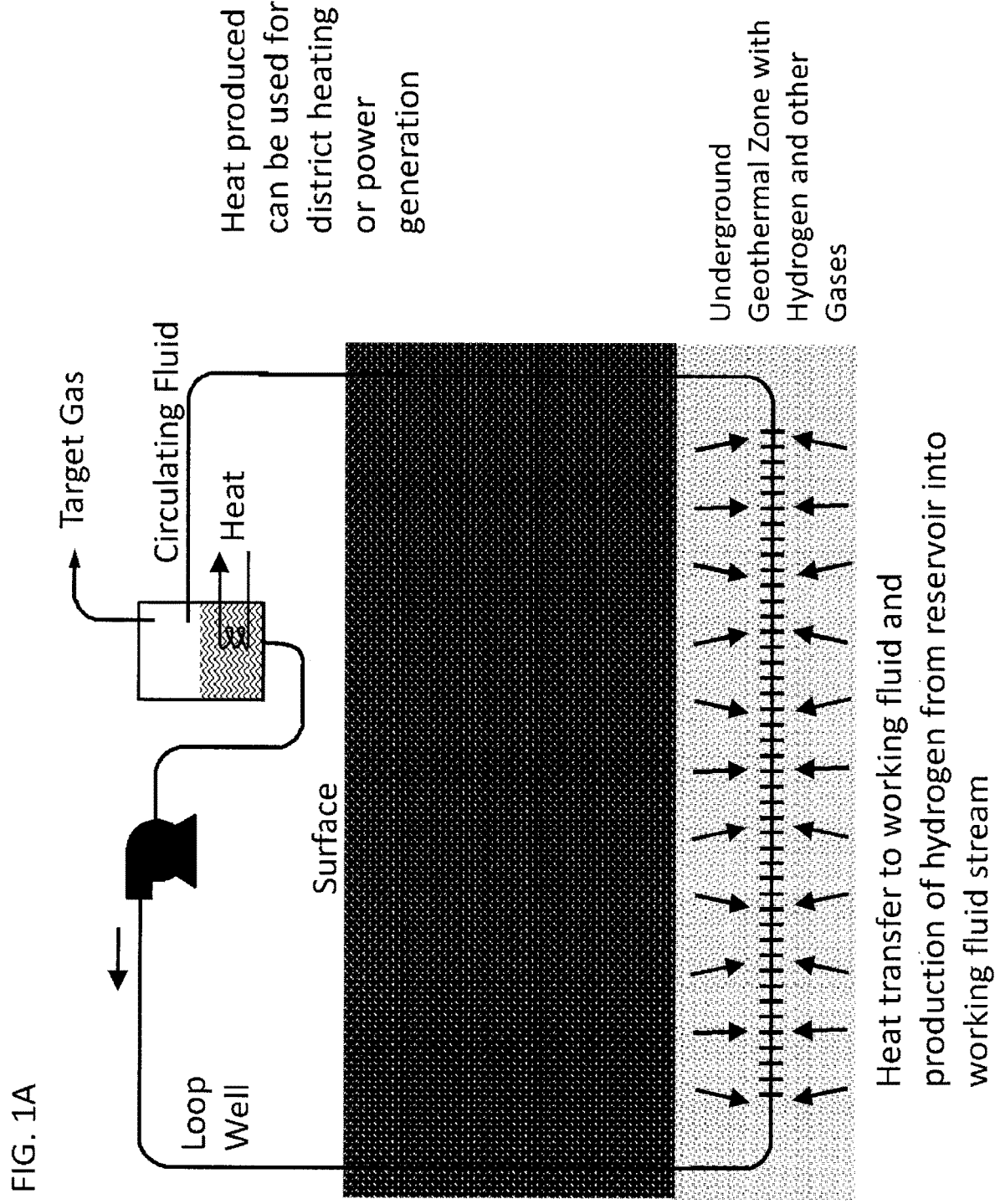
FIG. 1A is a simple schematic view of a first embodiment of the present invention.
Figure 1B:
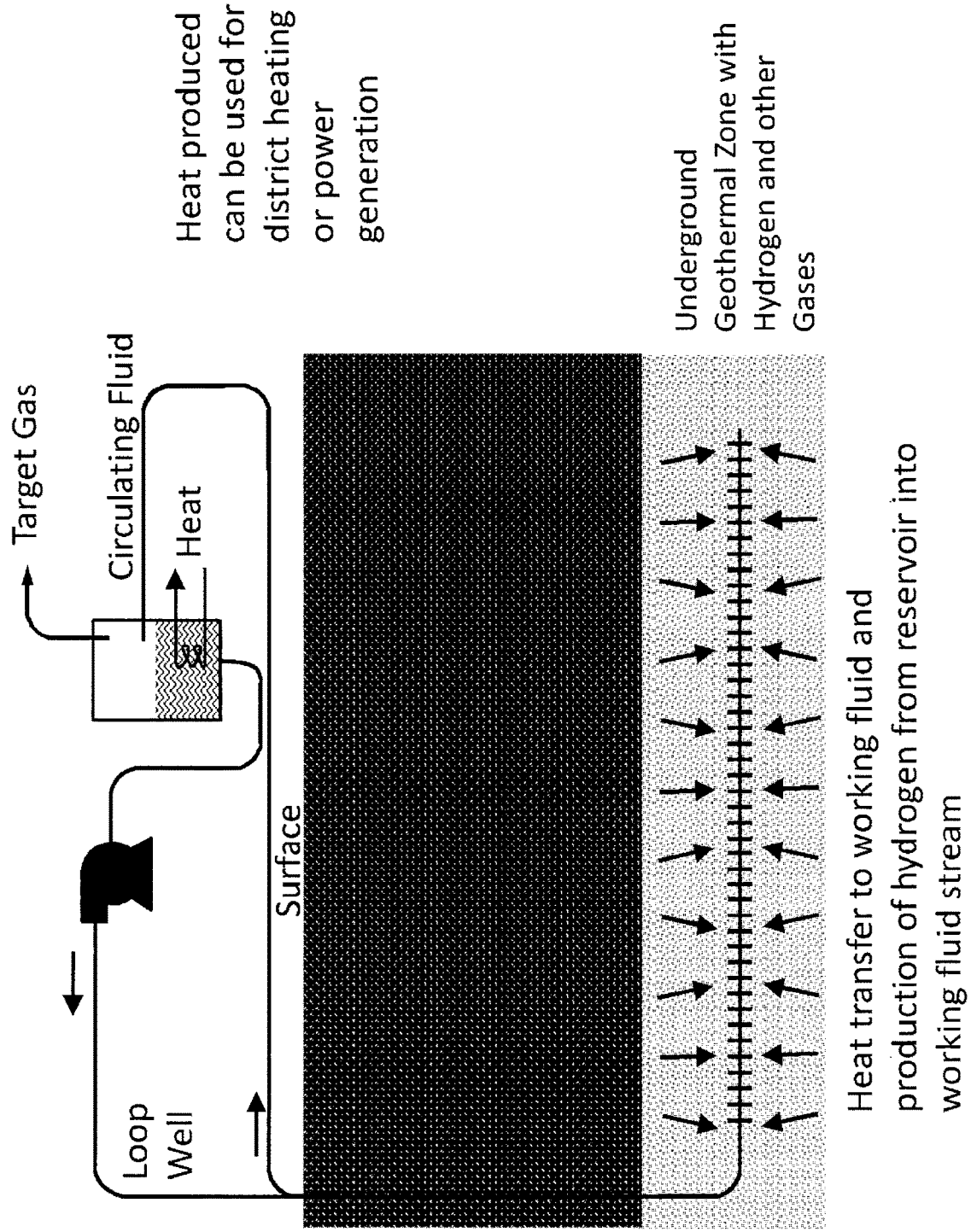
FIG. 1B is a simple schematic view of a second embodiment of the present invention.
Figure 1C:
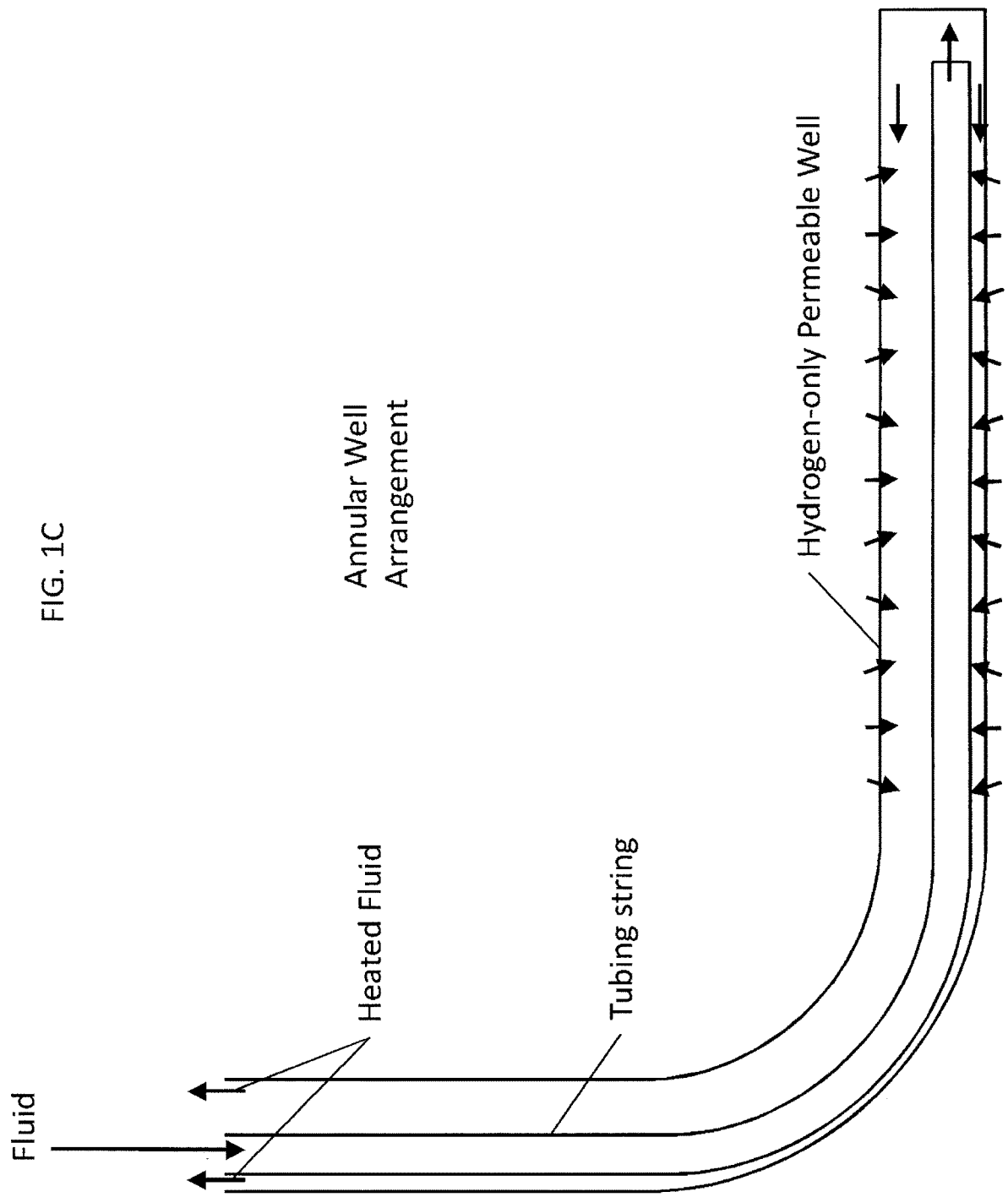
FIG. 1C is a simple schematic view of an exemplary embodiment of the present invention.

FIGS. 1A, 1B, and 1C are diagrams exemplifying implementation of the methods and systems described herein for producing hydrogen from a sufficiently hot reservoir. In these methods, hydrogen is liberated from formation water and produced through a hydrogen selective membrane for production to surface.

The column of buoyant hydrogen ensures the continuous concentration gradient from one side of the membrane to the other. The design shown in FIG. 1C can be extended to a loop well where the heat transfer fluid is injected into the well at surface and the fluids are produced to surface using the same well.

Figure 2:
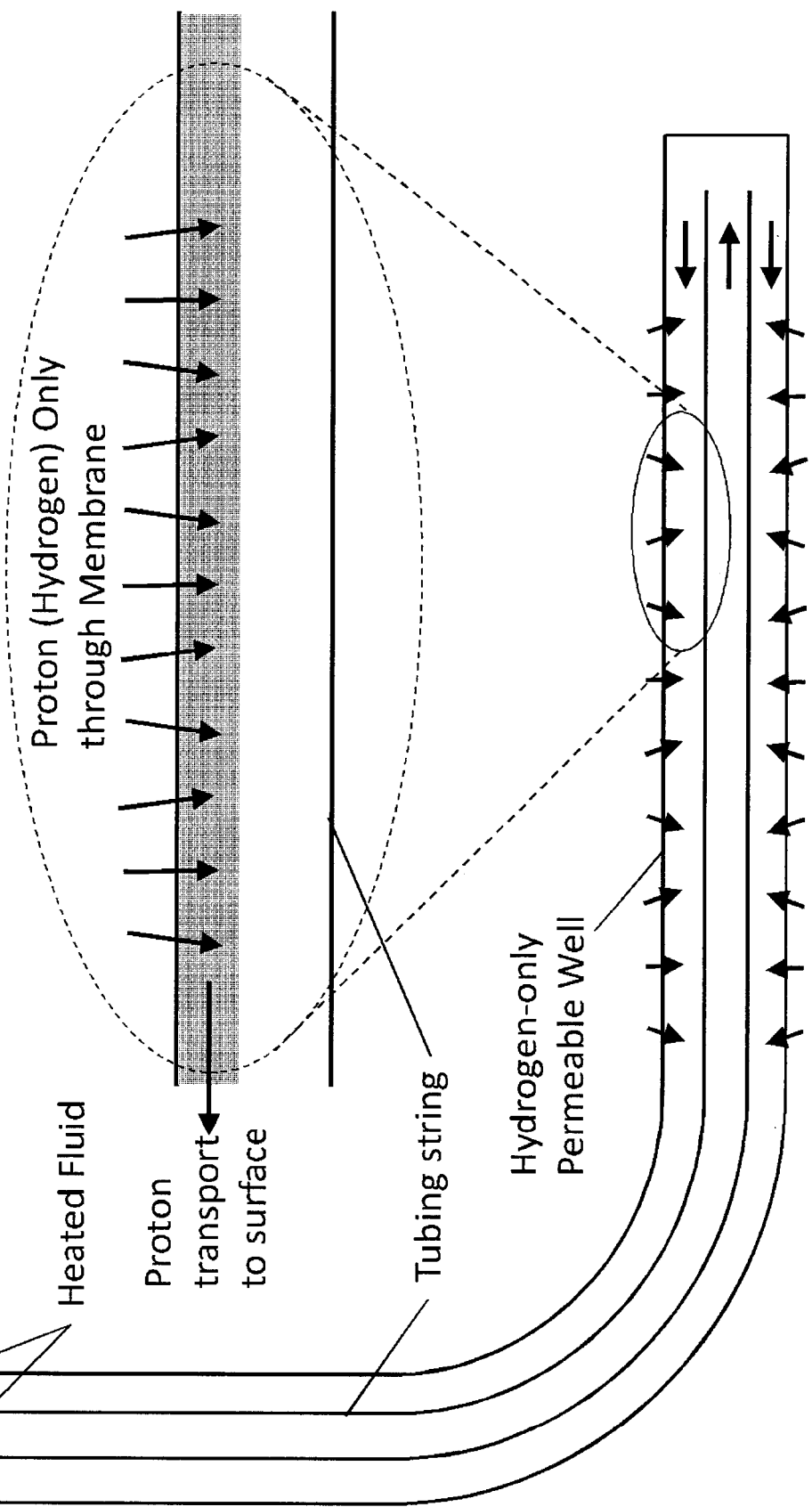
FIG. 2 is a simple schematic view of another exemplary embodiment of the present invention.

FIG. 2 is a diagram exemplifying one implementation where protons are scavenged by a proton selective membrane and passed toward the surface in a graphane or platinum or nafion composite.

Figure 3:
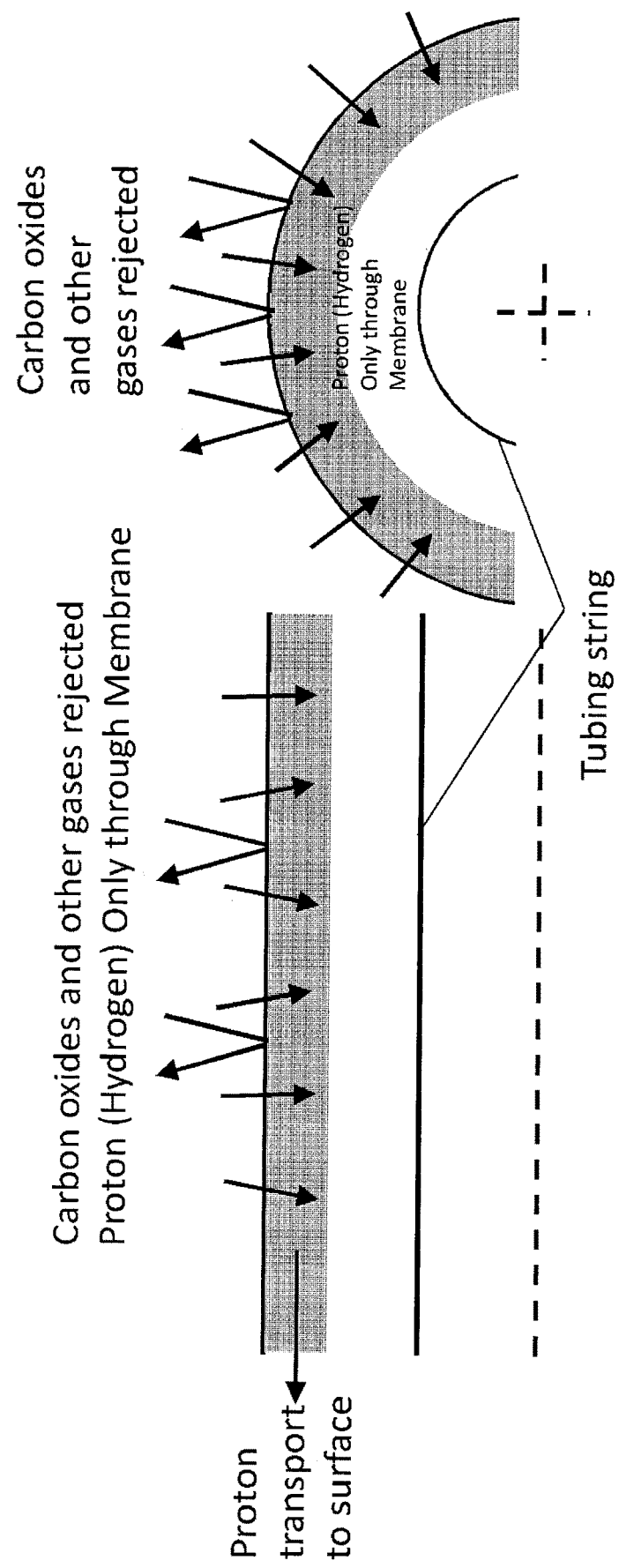
FIG. 3 is a simple schematic view of a further exemplary embodiment of the present invention.

FIG. 3 shows an example of hydrogen-separating composite membranes, viewed in cross-section within a wellbore. Other gas components (CO, CO2, H2S) can be rejected by the membrane.

A. Finding or Making a Hot Reservoir

The reservoir may have an ambient natural temperature sufficient for gasification and water-gas shift reactions to take place within the reservoir. Alternatively, the reservoir may be heated by other means, including but not limited to exothermic reactions via injection, electromagnetic radiation, phonon or acoustic stimulation, steam injection, nuclear reactions, electrical resistance, or magma transference.

B. Gasification and Water-Gas Shift

When the reservoir is at sufficient temperature, gasification and water-gas shift reactions occur with consequent generation of hydrogen. Gas components collect within the reservoir.

C. Production of Hydrogen

Hydrogen is produced from the reservoir through hydrogen-only membranes within the production well. In this manner, the hydrogen sulphide, carbon monoxide, carbon dioxide, steam, and other gas components remain in the reservoir. Since hydrogen is removed from the reservoir, this promotes the reactions to generate more hydrogen.

Protons may be produced from the reservoir through proton-only membranes within the production well. In this manner all other matter can remain in the reservoir, while protons are passed up to the surface using a proton transfer medium such as but not limited to graphane composites.

For the hydrogen-only transport membrane to be placed in the production well, metallic membranes, for example constructed from palladium (Pd), vanadium (V), tantalum (Ta) or niobium (Nb), are mechanically robust but with limited ranges of optimal performance with respect to temperature. These membranes work by a solubility-diffusion mechanism, with the hydrogen dissolving in the membrane material and diffusing to the other side where it is released; this mechanism yields hydrogen flux (moles transport rate per unit area) proportional to the square root of the pressure. To illustrate, vanadium and titanium permeability to hydrogen drops at high temperatures and also forms metal oxide layers that prevent efficient hydrogen separation, making them ideal for anoxic lower-temperature settings. Pd-based membranes have the advantage since their hydrogen permeability rises with increasing temperature. However, Pd membranes are poisoned by hydrogen sulphide (H2S) and carbon monoxide (CO) which are often present within Earth. This can be countered by using Pd-Copper alloys. For cost reduction, multi-layer membranes consisting of Pd—Cu alloy and V, Ta, and Nb could be constructed.

Ceramic membranes, stainless steel membranes, inconel membranes are inert to H2S and CO and can be used at very high temperatures.

In some embodiments the hydrogen membrane is configured to be highly selective to hydrogen (especially if the hydrogen gas is to be used for power generation from a fuel cell at surface), highly permeable to hydrogen, capable of withstanding heating up to or exceeding 800 degrees Celcius, able to withstand H2S and CO gas, robust mechanically given the issues of placing the membranes in the well, and/or capable of being manufactured in geometries that can fit in appropriately configured wells such as long horizontal wells. In some embodiments the membranes can also withstand the partial oxidation stage which will consume carbon and other solid buildup on the exterior surface of the composite membrane.

In some embodiments, the hydrogen produced by the systems and methods described herein can be used in fuel cells to generate power, combusted to produce steam which can be used to generate power, or used as a chemical feedstock.

Although the present specification has described particular embodiments and examples of the methods and treatments discussed herein, it will be apparent to persons skilled in the art that modifications can be made to the embodiments without departing from the scope of the appended claims.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A method for producing hydrogen from an underground geothermal reservoir, the underground geothermal reservoir containing water, the method comprising the steps of:
    allowing at least one of gasification or water-gas shift reactions to occur to the water within the underground geothermal reservoir to form a gas stream comprising hydrogen;
    providing a well from surface to the underground geothermal reservoir, the well configured to circulate a working fluid wholly within the well between the surface and the underground geothermal reservoir to transport heat from the underground geothermal reservoir to the surface, wherein the working fluid is heated during passage through the well adjacent the underground geothermal reservoir to form a heated working fluid which is transported to the surface;
    extracting the heat from the heated working fluid at the surface to form a cooled working fluid, and directing the cooled working fluid back through the well to the underground geothermal reservoir;
    a portion of the well adjacent the underground geothermal reservoir comprising at least one hydrogen-permeable membrane composed of an alloy of palladium, the at least one hydrogen-permeable membrane configured to permit passage of only the hydrogen in the gas stream therethrough;
    allowing the gas stream to engage the at least one hydrogen-permeable membrane, such that the at least one hydrogen-permeable membrane permits passage of only the hydrogen in the gas stream into the heated working fluid for transport of the hydrogen therein to the surface; and
    extracting the hydrogen from the heated working fluid at the surface before the cooled working fluid is directed back through the well to the underground geothermal reservoir.

2. The method of claim 1 wherein oxygen is scavenged within the geothermal reservoir by chemical reactions forming oxides from the oxygen due to the gasification or water-gas shift reactions.

3. The method of claim 2 wherein the well is a loop well within which the working fluid circulates.

4. The method of claim 2 wherein the well comprises an annular well arrangement within which the working fluid circulates.

5. The method of claim 1 wherein the step of allowing at least one of gasification or water-gas shift reactions comprises inducing the geothermal reservoir to a sufficient temperature via exothermic reactions, nuclear reactions, thermogenic radioactive decay, phonon or acoustic stimulation, steam injection, electromagnetic radiation, or electrical resistance.

6. The method of claim 1 wherein the at least one hydrogen-permeable membrane comprises at least one of vanadium, tantalum, and niobium.

7. The method of claim 1 wherein the at least one hydrogen-permeable membrane is composed of palladium and copper alloys.

8. The method of claim 1 wherein the at least one hydrogen-permeable membrane further comprises at least one ceramic layer and/or permeable or impermeable structural metal or metal alloy layer and/or a polymer membrane.

9. The method of claim 1 wherein the water-gas shift reactions occur to the water to form the gas stream, such that production of the hydrogen to the surface promotes generation of additional hydrogen due to the water-gas shift reactions, the method further comprising producing the additional hydrogen to the surface.

10. The method of claim 1 wherein the well is a loop well within which the working fluid circulates.

11. The method of claim 1 wherein the well comprises an annular well arrangement within which the working fluid circulates.

12. A method for producing hydrogen from a reservoir to surface using a geothermal heat transfer well, the method comprising the steps of:

allowing at least one of gasification or water-gas shift reactions to occur to water within the reservoir to form a gas comprising hydrogen;

providing a portion of the geothermal heat transfer well adjacent the reservoir with a membrane, the membrane configured to permit passage therethrough of only the hydrogen in the gas;

circulating a working fluid through the geothermal heat transfer well between the surface and the reservoir;

heating the working fluid during passage through the geothermal heat transfer well adjacent the reservoir to form a heated working fluid;

allowing the gas to engage the membrane, such that the membrane permits passage of the hydrogen into the heated working fluid;

transporting the heated working fluid carrying the hydrogen to the surface through the geothermal heat transfer well;

extracting the hydrogen from the heated working fluid at the surface;

extracting heat from the heated working fluid at the surface to form a cooled working fluid; and directing the cooled working fluid back through the geothermal heat transfer well to the reservoir to take up additional heat and additional hydrogen.

13. The method of claim 12 wherein the working fluid is continuously circulated through the geothermal heat transfer well between the surface and the reservoir.

14. The method of claim 12 wherein the membrane comprises at least one of vanadium, tantalum, and niobium.

15. The method of claim 12 wherein the membrane is composed of palladium and copper alloys.

* * * * *